(12) United States Patent
Graham et al.

(10) Patent No.: US 8,833,330 B2
(45) Date of Patent: Sep. 16, 2014

(54) METHOD OF MANUFACTURING AN ENGINE BLOCK

(71) Applicant: Caterpillar Inc., Peoria, IL (US)

(72) Inventors: Curtis J. Graham, Peoria, IL (US); Adam W. Ostein, Edelstein, IL (US); Christian E. Sabotta, Washington, IL (US); Robert E. Sharp, Corinth, MS (US); Trent A. Simpson, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 90 days.

(21) Appl. No.: 13/713,266

(22) Filed: Dec. 13, 2012

(65) Prior Publication Data

US 2014/0165955 A1    Jun. 19, 2014

(51) Int. Cl.
*F02B 75/22*   (2006.01)
*F02F 7/00*    (2006.01)
*B23P 6/02*    (2006.01)
*F02B 75/02*   (2006.01)

(52) U.S. Cl.
CPC ......... *F02F 7/0021* (2013.01); *F02B 2075/025* (2013.01); *F05C 2201/021* (2013.01); *F02F 7/0053* (2013.01); *F02F 7/0007* (2013.01); *B23P 6/02* (2013.01); *F02F 7/0012* (2013.01)
USPC .................................................. 123/195 R

(58) Field of Classification Search
CPC ..... F02F 7/0053; F02F 7/0007; F02F 7/0012; F02B 2075/025; F05C 2201/021
USPC .................................................. 123/195 R
See application file for complete search history.

(56) References Cited

U.S. PATENT DOCUMENTS

| | | | |
|---|---|---|---|
| 1,473,139 | A | 11/1923 | Bull et al. |
| RE18,644 | E | 11/1932 | Yount |
| 2,275,310 | A | 3/1942 | Nuttall |
| 2,751,671 | A | 6/1956 | Welch et al. |
| 3,675,309 | A | 7/1972 | Borkoski |
| 3,830,209 | A | 8/1974 | Jones, Jr. et al. |
| 5,222,295 | A | 6/1993 | Dorris, Jr. |
| 5,666,725 | A | 9/1997 | Ward |
| 5,873,163 | A | 2/1999 | Diefenthaler et al. |
| 6,935,635 | B2 | 8/2005 | Matsushita |
| 2004/0244758 | A1 | 12/2004 | Weng et al. |
| 2010/0000090 | A1 | 1/2010 | Moss et al. |

FOREIGN PATENT DOCUMENTS

| | | |
|---|---|---|
| DE | 1751211 A1 | 4/1971 |
| DE | 2716498 A1 | 10/1978 |
| DE | 4344653 A1 | 7/1994 |
| DE | 10205179 A1 | 8/2003 |
| GB | 1110271 A | 4/1968 |
| GB | 1478379 A | 6/1977 |

OTHER PUBLICATIONS

U.S. Appl. No. 13/713,391, titled "Self-Centering Seal" filed Dec. 13, 2012, 33 pages.

*Primary Examiner* — Lindsay Low
*Assistant Examiner* — Charles Brauch

(57) ABSTRACT

A method for manufacturing an engine block includes removing material from the top deck of the engine block surrounding a first opening to create a first recessed area, placing a first seal within the first recessed area, positioning a first insert within the first recessed area and against the first seal. The method may also include removing material from the top deck of the engine block surrounding a second opening to create a second recessed area that at least partially overlaps the first recessed area, placing a second seal in the second recessed area and positioning a second insert within the second recessed area and against the second seal.

20 Claims, 6 Drawing Sheets

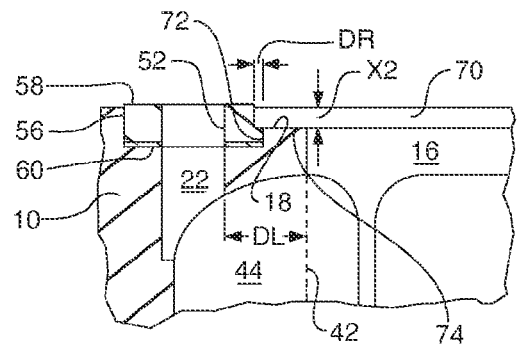
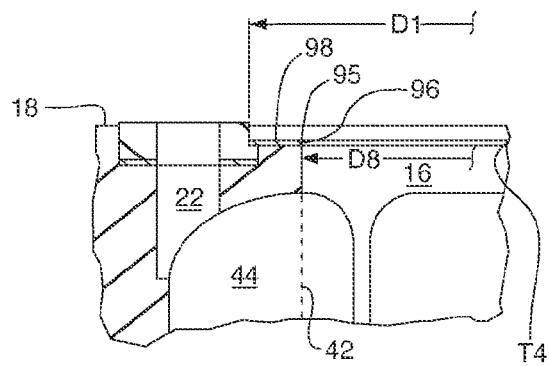
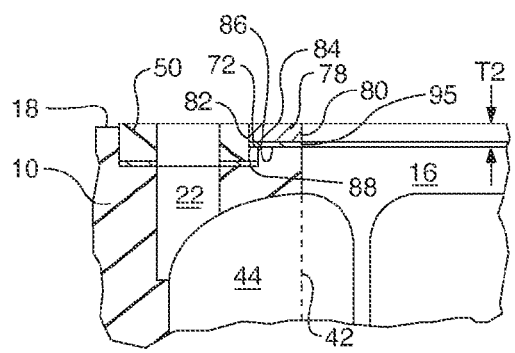

METHOD OF MANUFACTURING AN ENGINE BLOCK

TECHNICAL FIELD

The present disclosure relates generally to a method of manufacturing an engine block. More particularly, the present disclosure relates to remanufacturing an engine block by removing material from the top deck surrounding a plurality of openings and positioning seals and inserts in the recessed areas.

BACKGROUND

Many components of an internal combustion engine are subject to high loads and wear during operation of the engine. One such component, for example, is the engine block, which may experience loads from combustion events occurring within combustion chambers formed by the cylinder head, pistons, and cylinder bores of the engine block. These events may subject the engine block to high loads and stresses, including thermal stresses and mechanical stresses, which may be transmitted to the engine block at, among other locations, the cylinder head, which is mounted to a top deck of the engine block, and the cylinder bores. As a result of these stresses, small cracks may form, or general wear may occur, within the engine block, particularly within or near the cylinder bores at the top deck of the engine block. In addition, wear and erosion may occur along edges of fluid passages surrounding the cylinder bores and opening through the top deck.

U.S. Pat. No. 5,222,295 teaches a method for repairing diesel engine cylinder blocks. Specifically, the cited reference teaches a method for removing selected portions along the longitudinal axis of a cylinder bore of the engine block, and installing inserts within the cavities formed within the cylinder bore. Although the described method may adequately repair cracks occurring within the cylinder bore, the reference does not contemplate cracks that may radiate from the cylinder bore and across the top deck of the engine block, or that may occur along edges of the surrounding water passages. Nor does the method address providing sealing for a relatively shallow insert. Additionally, there remains a continuing need for methods of engine block repair and remanufacture that are effective and economically feasible.

SUMMARY OF THE DISCLOSURE

In one aspect, a method is described for manufacturing an engine block includes removing material from the top deck of the engine block surrounding a first opening, such as a fluid passage, cylinder bore, or attachment bore, to create a first recessed area including a first bottom surface. The method also includes placing a first seal around the first opening on the first bottom surface, the first seal including an inner diameter that matches the first opening, and positioning a first insert within the first recessed area and against the first seal.

In another aspect, an engine block for an internal combustion engine includes a top deck, a first opening formed within the engine block and opening through the top deck, a first recessed area surrounding the first opening and including a first bottom surface, a first seal on the first bottom surface, the first seal including an inner diameter that matches the first opening, and a first insert positioned within the first recessed area.

In a further aspect, a remanufacturing kit for an engine block including a top deck defining a cylinder bore and a plurality of fluid passages is described. The remanufacturing kit includes a plurality of cylindrical first inserts, each of the plurality of first inserts having a first depth, a first outer diameter, and a passage extending through the first insert, and configured to be positioned within a recessed area surrounding one of the plurality of fluid passages. The remanufacturing kit also includes a plurality of first seals including an inner diameter matching a diameter of one of the plurality of fluid passages, each of the first seals configured to be positioned between one of the first inserts and the engine block in the recessed area surrounding one of the plurality of fluid passages. The remanufacturing kit also includes a ring-shaped second insert including an inner diameter matching a diameter of the cylinder bore, a second depth, and a second outer diameter and being configured to be positioned within a recessed area surrounding the cylinder bore. The remanufacturing kit additionally includes a second seal including an inner diameter matching a diameter of the cylinder bore, the second seal configured to be positioned between the second insert and the engine block in the recessed area surrounding the cylinder bore. Furthermore, the first depth of the first insert is greater than the second depth of the second insert. Additionally, when each of the plurality of first inserts are positioned within corresponding recessed area surrounding each of the plurality of fluid passages and the second insert is positioned with the recessed area surrounding the cylinder bore, the second outer diameter is configured to overlap a portion of the first outer diameters.

BRIEF DESCRIPTION OF THE DRAWINGS

FIG. 7 is a partial cross sectional view of the top deck of the engine block of FIG. 2 along line A-A, with a second recessed area surrounding the cylinder bore;

FIG. 8 is a partial cross sectional view of the top deck of the engine block of FIG. 2 along line A-A, with a second seal placed in the second recessed area;

FIG. 9 is a partial cross sectional view of the top deck of the engine block of FIG. 2 along line A-A, with a second insert positioned in the second recessed area;

DETAILED DESCRIPTION

Figure 1:
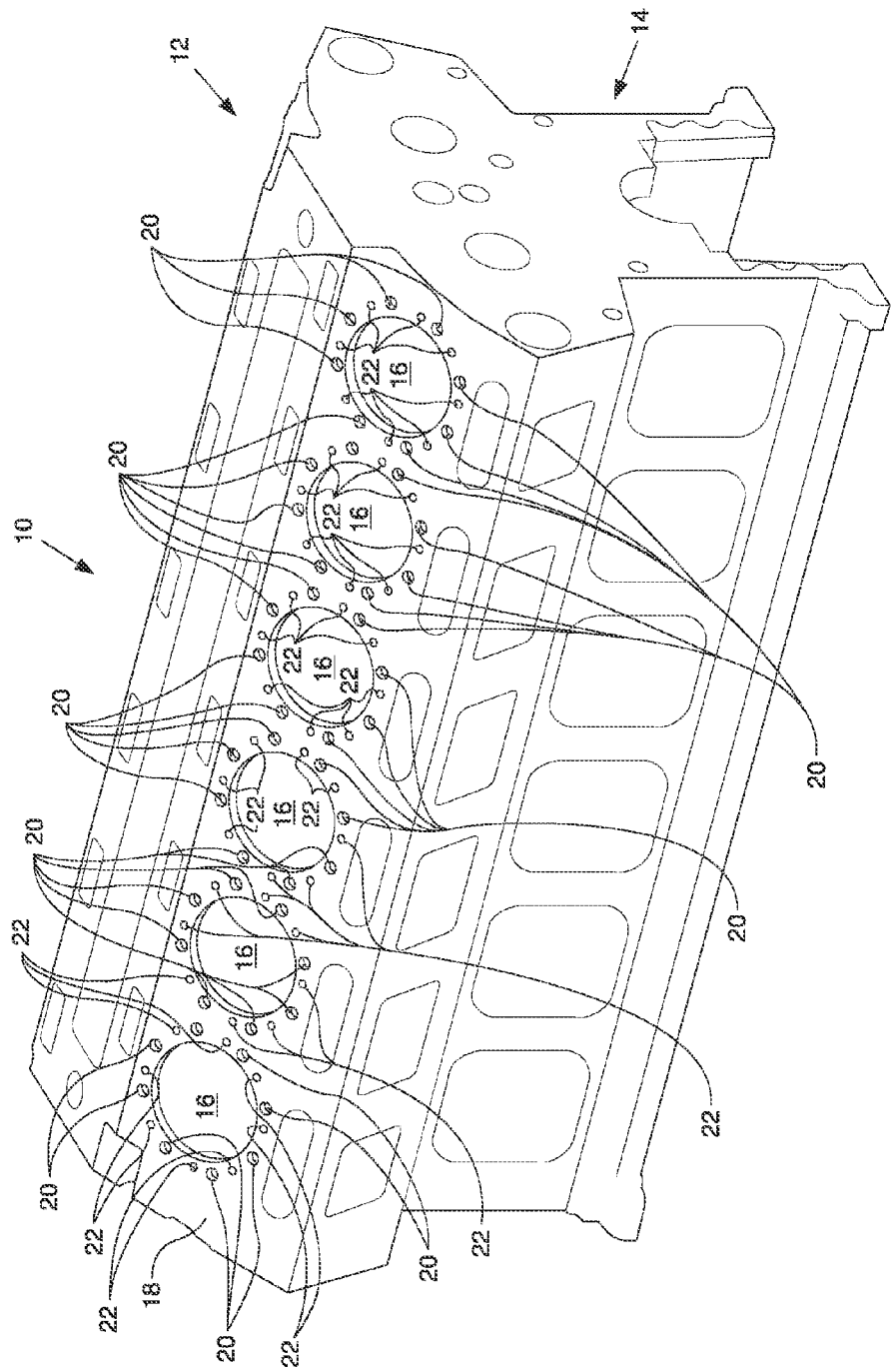
FIG. 1 is a perspective view of an engine block, according to the present disclosure.

An exemplary embodiment of an engine block 10, also referred to as a cylinder block, is shown generally in FIG. 1.

The engine block 10 may, for example, be constructed of cast iron or, alternatively, aluminum or magnesium, or any other desirable material, and may include one or more cylindrically bored holes for receiving pistons of an internal combustion engine, such as a compression ignition engine or a spark-ignited engine. It should be appreciated that such an internal combustion engine, which includes engine block 10, may be used to power an on-highway or off-highway machine, stationary equipment, or any other known machine or vehicle.

The engine block 10 may be a one-piece casting and may generally include an upper section 12 and a lower section 14. The upper section 12 of the engine block 10 may include a variety of openings, such as cylinder bores, fluid passages, and attachment bores. In the depicted embodiment, the upper section 12 may include a plurality of cylinder bores 16 formed within the engine block 10 and opening through a top deck 18 of the engine block 10. Although six cylinder bores 16 are shown, it should be appreciated that the engine block 10 may include any number of cylinder bores 16, each of which may or may not include a cylinder liner. A cylinder head (not shown) may be attached to the engine block 10, such as, for example, by using a plurality of attachment bolts that may be threadably received within a corresponding number of attachment bores 20. The cylinder head, as is known in the art, may seal each of the cylinder bores 16, thus creating combustion chambers therein, and may provide a structure for supporting intake and exhaust valves and/or ports, fuel injectors, necessary linkages, and/or other known devices or structures.

The upper section 12 of the engine block 10 may also include a plurality of fluid passages 22, such as water passages, circumferentially spaced about each cylinder bore 16. Although eight fluid passages 22 are shown, it should be appreciated that any number of fluid passages 22 may be provided throughout the engine block 10. Each fluid passage 22 may be formed within the engine block 10 and may open through the top deck 18, as shown. It should be appreciated that the fluid passages 22, and additional fluid passages and/or chambers within the engine block 10, may form a water jacket or other similar cooling system for controlling circulation of a coolant and providing proper cooling of the engine block 10. It should also be appreciated that the fluid passages 22, which may include ferrule type coolant directors, and/or the water jacket may be configured to provide cooling of the cylinder head, or components thereof, attached to the engine block 10. Furthermore, while the diameters of the fluid passages 22 shown in FIG. 1 are illustrated as being approximately the same, it should be appreciated that the size and shape of some of the fluid passages 22 may different from the size and shape of some of the other fluid passages 22.

The lower section 14 of the engine block 10 may also include and/or define a portion of the water jacket described above. The lower section 14 may be of conventional form, and may include a crankcase, in which a crankshaft rotates. The lower section 14 of the engine block 10, as well as the cylinder head and the internal combustion engine, in general, are not within the scope of the present disclosure and, therefore, will not be described herein in greater detail. It should be appreciated, however, that the engine block 10, including features described herein, is contemplated for use with any type and/or configuration of internal combustion engine.

Figure 2:
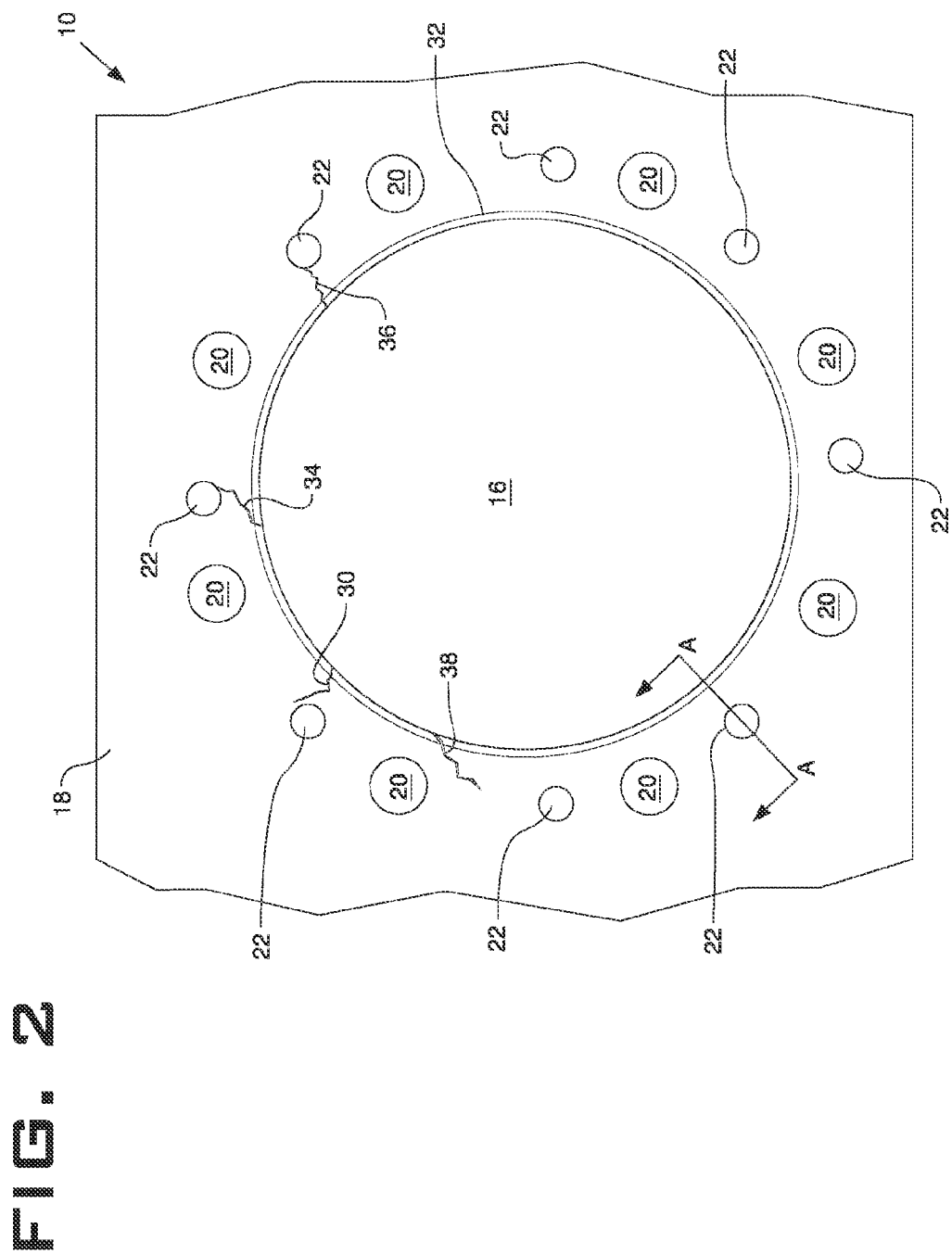
FIG. 2 is a plan view of a top deck of the engine block of FIG. 1, depicting exemplary cracks that may form near a cylinder bore and adjacent fluid passages.

Turning now to FIG. 2, a portion of the top deck 18 of the engine block 10 is shown. Particularly, one of cylinder bores 16 and adjacent, or surrounding, attachment bores 20 and fluid passages 22 are shown, along with cracks that may occur within the top deck 18. Specifically, during operation of an internal combustion engine that includes engine block 10, or even during the original manufacture thereof, one or more cracks may form within the top deck 18 of the engine block 10, as should be appreciated by those skilled in the art. For example, a crack 30 may form within the cylinder bore 16, shown with a cylinder liner 32 disposed therein, and may radiate therefrom along the top deck 18 of the engine block 10. According to one embodiment, such a crack may extend to one of the fluid passages 22, as shown at 34. Similarly, a crack 36 may form within one of the fluid passages 22 or attachment bores 20 and may extend therefrom across the top deck 18 of the engine block 10. Wear or erosion may also occur at edges of the fluid passages 22 along the top deck 18. Additional cracks, such as crack 38, and/or wear may occur within the top deck 18 of the engine block 10 in a variety of locations, as should be appreciated by those skilled in the art.

Figure 11:
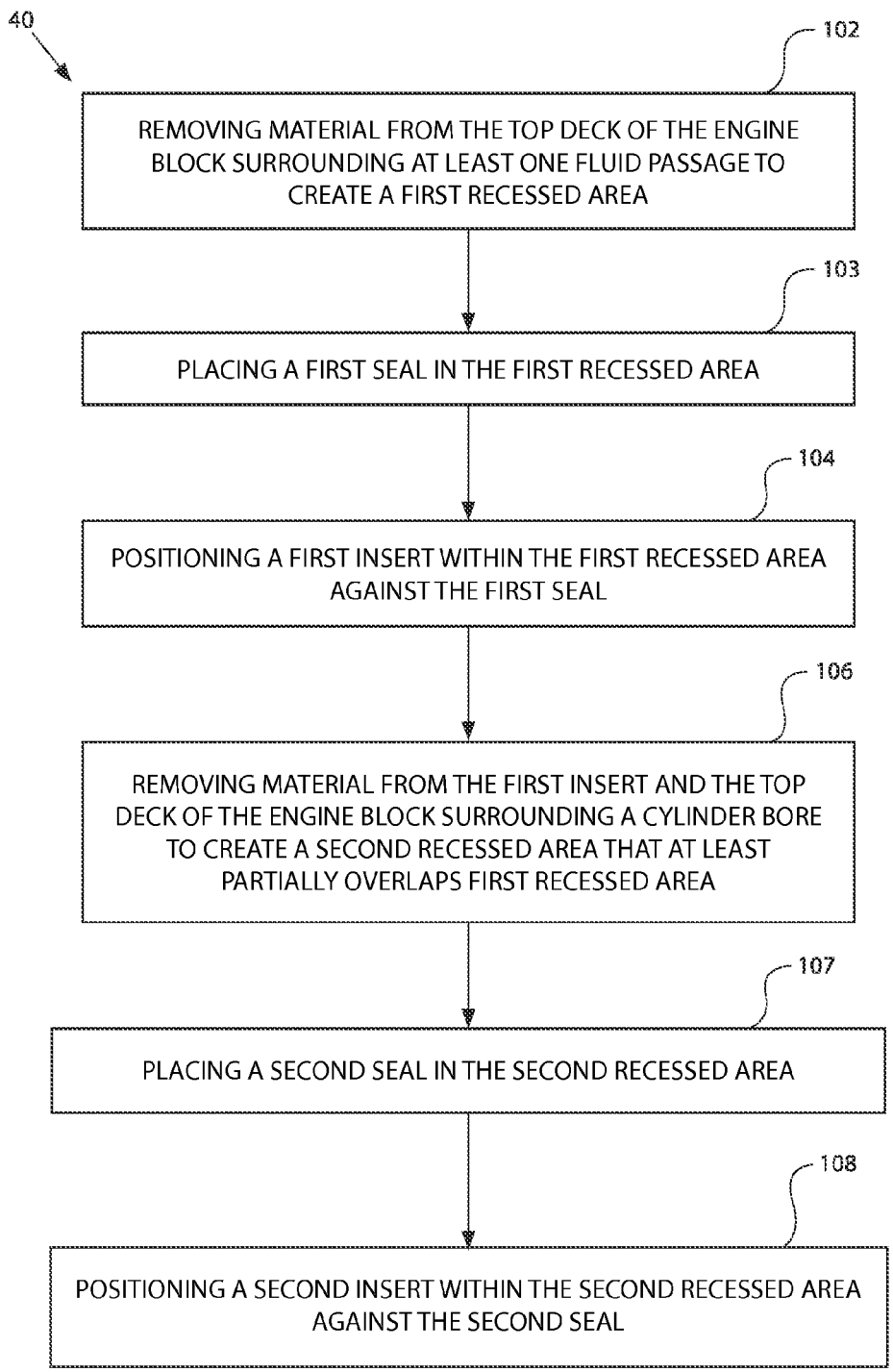
FIG. 11 is a flow diagram illustrating a method of manufacturing the engine block of FIG. 1.

During a manufacturing process 40 (FIG. 11) of the engine block 10, material from the top deck 18 of the engine block 10 that surrounds openings in the top deck, such as cylinder bores, fluid passages, and attachment bores, may be removed to create recessed areas. Seals may be positioned within the recessed areas. Inserts may be positioned within the recessed areas against the seals and such that a first insert overlaps a portion of a second insert. It is contemplated that the process may, in some embodiments, include multiple "levels" of overlapping. For example, a first insert may overlap a second insert that overlaps a third insert.

As used herein, "manufacturing" may refer broadly to the original manufacture, remanufacture, repair, or other similar process associated with the engine block 10. Specifically, engine block material, which may include one or more of the cracks 30, 34, 36, and 38 shown in FIG. 2, may be removed from the engine block 10. Material may be removed from the top deck 18 of the engine block 10 using any known machining process, such as, for example, milling or grinding. The process can be manual and/or automatic. According to one embodiment, for example, a machining tool used to remove material from the engine block 10 may be operated via computer numerical control (CNC). However, any useful tool for removing engine block material according to precise specifications is contemplated.

Figure 3:
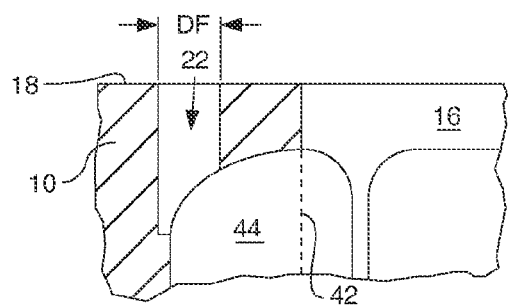
FIG. 3 is a partial cross sectional view of the top deck of the engine block of FIG. 1 along line A-A, depicting a fluid passage and cylinder bore.

FIGS. 3-11 illustrate an embodiment of the manufacturing process 40. In particular, FIG. 3 illustrates a partial cross-section of the engine block 10 along lines A-A (as shown in FIG. 2) prior to the manufacturing process 40. Dashed line 42 depicts where the cylinder liner 32 would be positioned if installed. The cylinder liner 32 separates the cylinder bore 16 from a fluid cavity 44. The fluid cavity 44 is in fluid communication with the fluid passage 22. The fluid passage 22 and the cylinder bore 16 open to the top deck 18, which is substantially flat and even in the areas surrounding the fluid passage 22 and cylinder bore 16.

Figure 4:
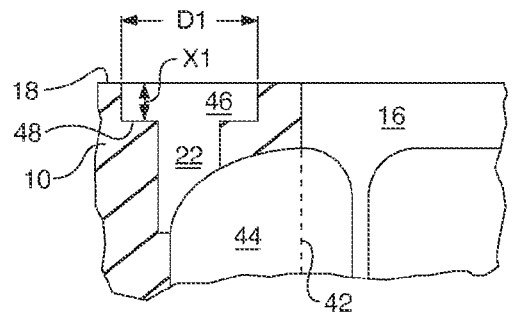
FIG. 4 is a partial cross sectional view of the top deck of the engine block of FIG. 2 along line A-A, with a first recessed area surrounding the fluid passage.

As shown in FIG. 4, engine block material surrounding at least one fluid passage 22, or opening, may be removed to create a first recessed area 46 including a first bottom surface 48. The fluid passages 22 are generally cylindrical and have a diameter $D_F$ at the top deck and extending down into the engine block 10. The first recessed area 46 may be configured in a variety of ways. The first recessed area 46 is configured to remove any wear and erosion that has occurred along the edges of fluid passages 22 and/or cracks surrounding the fluid passages 22. In the depicted embodiment, the first recessed area 46 is a generally cylindrical area having a diameter $D_1$ and a depth $X_1$. The first recessed area 46 may be centered on the first fluid passage 22 (i.e. coaxially with the first fluid passage) or may be offset. It will be understood that engine block material may be removed from the top deck 18 surrounding each of the plurality of fluid passages 22, resulting in a corresponding number of first recessed areas 46. Furthermore, it will be understood that the diameter $D_1$ and depth $X_1$ of the first recessed area 46 may vary for different engine sizes and types and may vary on a single engine block if desired.

In one embodiment, the first recessed area 46 has a diameter $D_1$ of about 20 mm to about 24 mm and a depth $X_1$ of about 10 mm to about 14 mm. In another embodiment, the first recessed area 46 has a diameter $D_1$ of about 22 mm and a depth $X_1$ of about 12 mm. In yet another embodiment, the first recessed area 46 has a diameter $D_1$ of about 30 mm to about 34 mm and a depth $X_1$ of about 10 mm to about 14 mm. In yet a further embodiment, the first recessed area 46 has a diameter $D_1$ of about 32 mm and a depth $X_1$ of about 12 mm. In another embodiment, the engine block 10 has a plurality of first recessed areas 46 with some of the first recessed areas having diameter $D_1$ of about 20 mm to about 24 mm while other of the first recessed areas having a diameter $D_1$ of about 30 mm to about 34 mm. For example, the engine block 10 of FIG. 2 has eight fluid passages 22. In one embodiment, four of the fluid passages 22 may have associated first recessed areas 46 with a diameter $D_1$ of about 20 mm to about 24 mm while the other four fluid passages 22 may have associated first recessed areas 46 with a diameter $D_1$ of about 30 mm to about 34 mm.

Figure 5:
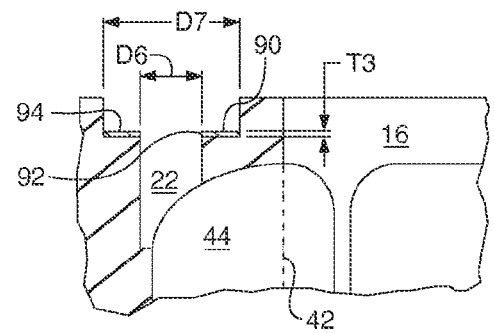
FIG. 5 is a partial cross sectional view of the top deck of the engine block of FIG. 2 along line A-A, with a first seal placed in the first recessed area.

Turning now to FIG. 5, a first seal 90 is shown placed within the first recessed area 46. The first seal 90 is annular in shape with an inner opening 92 having an inner diameter $D_6$ and an outer diameter $D_7$. At least a portion of the surface 94 of the first seal 90 between the inner diameter $D_6$ and the outer diameter $D_7$ is formed from a sealing material such as rubber, or any similar sealing material known in the art. The first seal 90, for example, may be an o-ring, a rubber-coated metal gasket, or an edge bonded integral seal. In an exemplary embodiment, the first seal is an edge bonded integral seal. The first seal 90 is provided such that the diameter $D_6$ that matches the diameter $D_F$ of the fluid passage 22. The first seal may also be provided with an outer diameter $D_7$ that is generally the same as the diameter $D_1$ of the first recessed area 22. The first seal may have a thickness $T_3$ of about 3 mm to about 10 mm, preferably about 5 mm to about 8 mm.

When placed in the first recessed area 46, the first seal 90 is positioned such that the inner opening 92 of the first seal 90 is aligned with the opening of the fluid passage 22. The surface 94 of the first seal 90 is placed against the first bottom surface 48 of the first recessed area 46.

Figure 6:
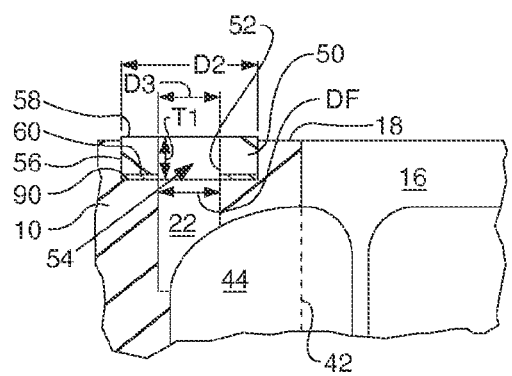
FIG. 6 is a partial cross sectional view of the top deck of the engine block of FIG. 2 along line A-A, with a first insert positioned in the first recessed area.

Turning now to FIG. 6, a first insert 50 is shown positioned within the first recessed area 46 and against the first seal 90. The first insert 50 may be configured to fit tightly within the first recessed area 46, such as by an interference fit. Thus, the first insert 50 may be shaped in a variety of ways corresponding to the shape of the first recessed area. The first insert 50, however, may be positioned and held in place in the first recessed area 46 by any suitable means. In the depicted embodiment, the first insert 50 is generally cylindrical with an inner surface 52 defining a passage 54 therethrough. The passage 54 has a diameter $D_3$ matching a diameter $D_F$ of the fluid passage 22 of the engine block 10. When positioned within the first recessed area 46, the passage 54 may be substantially aligned with the fluid passage 22 and first seal 90 or may be slightly offset. The first insert 50 has an outer surface 56 generally parallel to the inner surface 52. The first insert 50 has a top surface 58 generally parallel to a bottom surface 60. The top surface 58 and bottom surface 60 are generally flat and perpendicular to the inner surface 52 and outer surface 56.

The first insert 50 has a thickness $T_1$ and an outer diameter $D_2$. The combined thickness $T_1$ of the first insert 50 and thickness $T_3$ of the first seal 90 is configured to be equal to or greater than the depth $X_1$ of the first recessed area 46. For example, in one embodiment, the first insert 50 has a thickness $T_1$ of about 12 mm to 12.7 mm. In another embodiment, the first insert 50 has a thickness $T_1$ of about 12.35 mm. In a further embodiment, the first insert 50 has a thickness $T_1$ of about 3 mm to about 7 mm, preferably about 5 mm. The diameter $D_2$ of the first insert 50 is configured to allow the first insert 50 to fit securely within the first recessed area 46. Thus, the diameter of the first insert 50 is matched to the corresponding first recessed area. For example, where an interference fit is used to secure the first insert 50 in the first recessed area 46, the diameter $D_2$ of the first insert 50 is configured to be slightly larger than the diameter $D_1$ of the first recessed area 46. In one embodiment, the first insert 50 has a diameter $D_2$ about 0.02 mm to about 0.05 mm greater than the diameter $D_1$ of the first recessed area 46, and preferably about 0.035 mm greater. As indicated above, a plurality of first recessed areas 46 may be made in the engine block 10 and some of the plurality of first recessed areas may be sized different than some of the other first recessed areas. Likewise, first inserts 50 and first seals 90 with different diameters may be used on the same engine block 10 to match up with corresponding first recessed areas. In one embodiment, an engine block 10 includes a plurality of first inserts 50, some of which have a diameter that is about 40% or more greater than the diameter of the remaining plurality of first inserts.

In yet another embodiment, the first insert 50 may have a sealing material such as rubber, bonded to its bottom surface 60 using techniques knowing in the art for bonding materials such as rubber to metal, effectively forming a combined first insert 50 and first seal 90. The combined first seal 90 and first insert 50 could then be placed into the first recessed area 46 in a single step.

As shown in FIG. 7, engine block material surrounding at least one cylinder bore 16 having a cylinder diameter $D_C$ may be removed to create a second recessed area 70 having a second bottom surface 74. While only shown in partial view, it should be understood that the second recessed area 70 may extend around the entire circumference of the cylinder bore 16. The second recessed area 70 is configured to remove any wear or cracks surrounding the cylinder bore 16. In the depicted embodiment, the first recessed area 46 is generally ring-shaped and extends radially from the cylinder bore 16 to an outer diameter of $D_4$ (see FIG. 10). The second recessed area 70 extends radially from the cylinder bore 16 a radial distance $D_L$ sufficient to overlap a portion of the first recessed area 46 (and first insert 50). Thus, the second recessed area 70 is formed partially by removing material from the first insert 50. Since, the overlapping area is essentially defined by two overlapping circles; the area removed from the first insert 50 may be described as lens-shaped, as best seen on FIG. 10.

The first recessed area 46 has a depth $X_1$ that is greater than the depth $X_2$ of the second recessed area 70 and the second depth $X_2$ does not extend down to a depth such that the formation of the second recessed area 70 disturbs the first seal 90. In some embodiments, for example, the depth of the first recessed area may be 50% or more greater that the depth of the second recessed area. As a result, a lens-shaped shoulder 72 is formed on the first insert 50. In some embodiments, however, it may be possible to form the first insert 50 with the shoulder 72 as opposed to machining the shoulder when forming the second recessed area 70. When the first insert 50 is installed, the shoulder may be positioned toward the bore. Thus, the second recessed area 70 may be formed without removing material from the first insert 50.

It will be understood that engine block material may be removed from the top deck 18 surrounding each of the plurality of cylinder bores 16, resulting in a corresponding number of second recessed areas 70. Furthermore, it will be understood that the diameter $D_4$ and depth $X_2$ of the second recessed area 70 may vary for different engine sizes and types and may vary on a single engine block if desired. In one embodiment, the second recessed area 70 has a diameter $D_4$ of about 211 mm to about 215 mm and a depth $X_2$ of about 5.5 mm to about 9.7 mm. In another embodiment, the first recessed area 46 has a diameter $D_4$ of about 213 mm and a depth $X_1$ of about 7.6 mm.

Turning now to FIG. 8, a second seal 95 is shown placed within the second recessed area 70. The second seal 95 is annular in shape with an inner opening 96 having an inner diameter $D_8$ and an outer diameter $D_9$. At least a portion of the surface 98 of the second seal 95 between the inner diameter $D_8$ and the outer diameter $D_9$ is formed from a sealing material such as rubber, or any similar sealing material known in the art. The second seal 95, for example, may be an o-ring, a rubber-coated metal gasket, or an edge bonded integral seal. In an exemplary embodiment, the second seal 95 is an edge bonded integral seal. The second seal 95 is provided such that the inner diameter $D_8$ matches the diameter $D_C$ of the cylinder 16. The second seal 95 may also be provided with an outer diameter $D_9$ that is generally the same as the diameter $D_4$ of the second recessed area 70. The second seal 95 may have a thickness $T_4$ of about 0.5 mm to about 10 mm, preferably about 1.0 to about 3 mm, and more preferably about 1.5 mm.

When placed in the second recessed area 70, the second seal 95 is positioned such that the inner opening 96 of the second seal 95 is aligned with the opening of the cylinder 16. The surface 98 of the second seal 95 is placed against the second bottom surface 74 of the second recessed area 70.

As shown in FIG. 9, a second insert 78 is shown positioned within the second recessed area 70 and against second seal 95. The second insert 78 may be configured to fit tightly within the second recessed area 70, such as by an interference fit. The second insert 78, however, may be positioned and held in place in the second recessed area 70 by any suitable means. In the depicted embodiment, the second insert 78 is generally ring-shaped with an inner surface 80 defining an inner diameter configured to matching a diameter of the cylinder bore 16 and an outer diameter. The second insert 78 has an outer surface 82 generally parallel to the inner surface 80. The second insert 78 has a top surface 84 generally parallel to a bottom surface 86. The top surface 84 and bottom surface 86 are generally flat and perpendicular to the inner surface 80 and outer surface 82. An outer portion 88 of the bottom surface 86 is configured to engage the shoulder 72 formed on the first insert 50.

Figure 10:
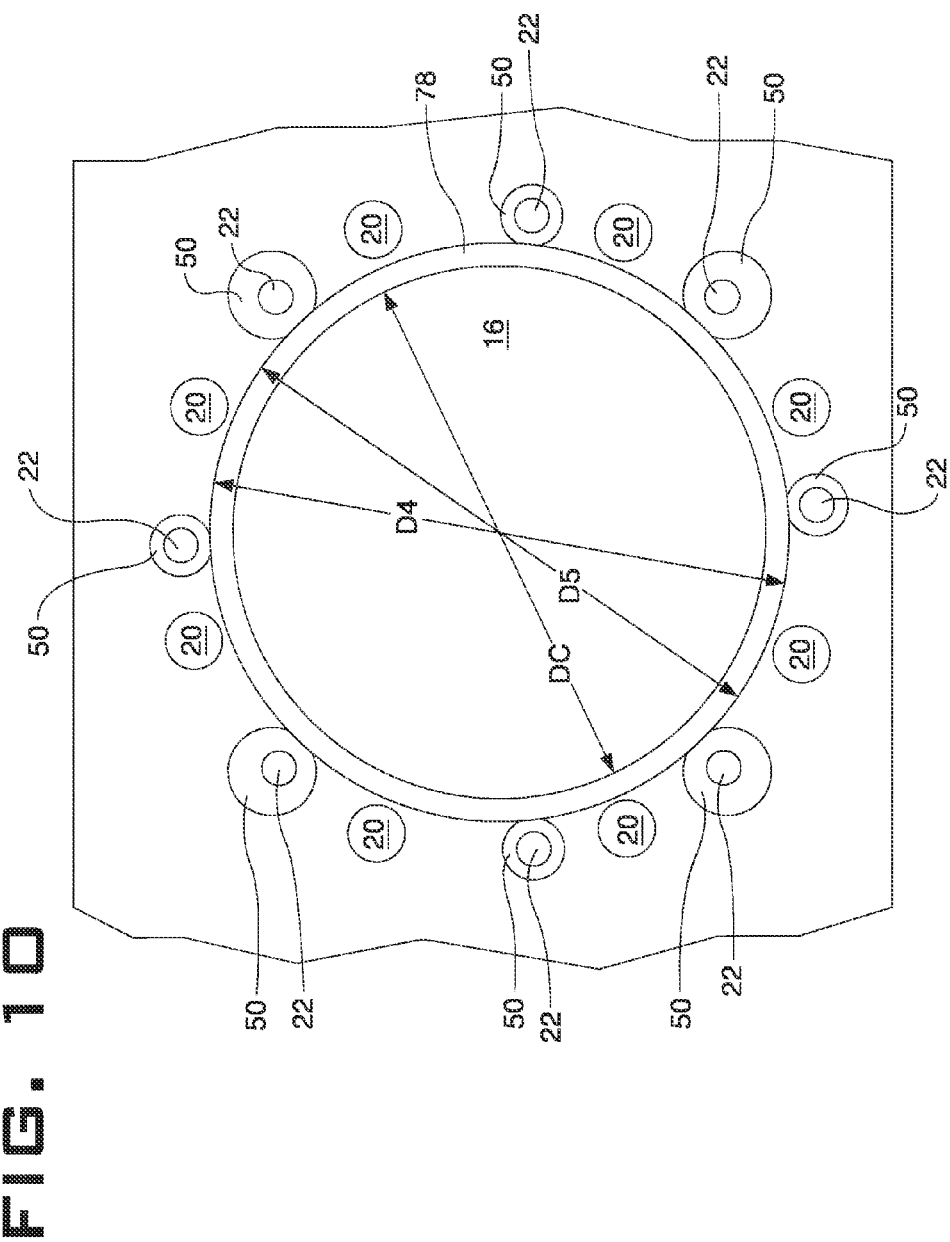
FIG. 10 is a plan view of a top deck of the engine block of FIG. 1 with inserts surrounding the fluid passages and cylinder bore.

The second insert 78 has a thickness $T_2$ and an outer diameter $D_5$ (see FIG. 10). The combined thickness $T_2$ of the second insert 78 and thickness $T_4$ of the second seal 95 is configured to be equal to or greater than the depth $X_2$ of the second recessed area 70. For example, in one embodiment, the second insert 78 has a thickness $T_2$ of about 5 mm to 10 mm, preferably about 5.5 to about 6.5 mm. In another embodiment, the second insert 78 has a thickness $T_2$ of about 6.1 mm. In addition, the thickness $T_2$ of the second insert 78 may be less than the thickness of the first insert 50. Thus, in some embodiments, when initially installed, both the first insert 50 and the second insert 78 protrude approximately the same distance above the top deck 18 of the cylinder block and the outer portion 88 of the bottom surface 86 of the second insert 78 engages the shoulder 72 of the first insert 50.

In yet another embodiment, the second insert 78 may have a sealing material such as rubber, bonded to its bottom surface 86 using techniques knowing in the art for bonding materials such as rubber to metal, effectively forming a combined second insert 78 and second seal 95. The combined second seal 95 and second insert 78 could then be placed into the first recessed area 70 in a single step.

The outer diameter $D_5$ of the second insert 78 is configured to allow the second insert 78 to fit securely within the second recessed area 70 and overlap the first insert 50 the radial distance $D_R$. Thus, the outer diameter $D_5$ of the second insert 78 is matched to the second recessed area 70. For example, where an interference fit is used to secure the second insert 78 in the second recessed area 70, the diameter $D_5$ of the second insert 78 is configured to be slightly larger than the diameter $D_4$ of the second recessed area 70. In one embodiment, the second insert 78 has a diameter $D_5$ about 0.044 mm to about 0.084 mm greater than the diameter $D_4$ of the second recessed area 70, and preferably about 0.064 mm greater.

The first insert 50 and the second insert 78 may be made from stainless steel, or any other useful material, and may include a substantially uniform thickness. In the depicted embodiment, while not illustrated, it will be understood that after positioning the first insert 50 and the second insert 78 within the first and second recessed areas 46, 70, respectively, a machining tool may be used to plane the surface of the top deck 18, thus removing any excess portions of the first insert 50 and second insert 78. Such a procedure may ensure a substantially planar surface of the top deck 18 after the first insert 50 and the second insert 78 have been positioned within the first and second recessed areas 46, 70, respectively.

Moreover, prior to placing the first insert 50 and second insert 78, a chemical adhesive (e.g. RTV®, LOCTITE®) may be applied to the inserts or to the recessed areas 46, 70, respectively. This may be done in addition to, or in lieu of an interference fit.

FIG. 10 shows a portion of the top deck 18 of one embodiment an engine block 10 according to the present disclosure after a plurality of first inserts 50, first seals 90, second insert 78 and second seals 95 are installed. As installed, the second insert 78 overlaps each of the first inserts 50. In the depicted embodiment, eight fluid passages 22 surround the cylinder bore 16. First insert 50 surrounds each of the eight fluid passages 22 and a second insert 78 surrounds the cylinder bore 16. Four of the eight first inserts 50 are larger in diameter than the other four first inserts 50. The four larger first inserts 50 are not centered on the corresponding fluid passages 22 that the first inserts 50 surround, while the four smaller first inserts 50 are generally centered. Regardless of being generally centered or off-center, the passage 54 in the first inserts 50 are substantially aligned with or slightly offset from the corresponding fluid passage 22 to allow fluid flow through the first inserts 50.

In yet another exemplary embodiment, a seal 90, 95 may in certain instances only be placed under one of the first insert 50 or second insert 78 and not under the other. For instance, the recessed area 70 may be formed around the cylinder opening 16, the seal 95 may be placed on the bottom surface 74 of the recessed area 70, and the insert 78 positioned in the recessed area 70 against the seal 95. If inserts 50 are placed around fluid passages 22, in this instance, they may not have seals 90 placed in the recessed areas 46. Dependent on the extent of the cracks in the top surface 18 of the engine, it may not be necessary for the first and second inserts 50, 78 to overlap.

Similarly, a recessed area 46 may be formed around a fluid passage, a seal 90 may be placed on the bottom surface 48 of the recessed area 46, and an insert positioned in the recessed are 46 and against the seal 90. If insert 78 is placed around the cylinder 16, in this instance, they may not have seals 95 placed in the recessed area 70.

INDUSTRIAL APPLICABILITY

The present disclosure finds potential applicability to any engine block that may be subject to operational loads causing cracks and/or wear. Further, the disclosure may be specifically applicable to engine blocks having cracks radiating from cylinder bores and extending across a top deck of the engine block. Yet further, the present disclosure may be applicable to fluid passages surrounding such cylinder bores that may be subject to general wear and/or erosion. Although the disclosure describes the remanufacture, or repair, of such engine blocks, the method described herein may also be used during manufacture to reduce the occurrence of such cracks and/or wear during operation.

During remanufacture, or repair, the engine block 10 may be inspected for cracks, such as by visual inspection or using a magneflux check or other known means. Cracks, such as cracks 30, 34, 36, and 38, may be discovered during the inspection. Additionally, one or more of the fluid passages 22 may exhibit wear and/or erosion around the openings thereof, along the top deck 18 of the engine block 10. To repair the engine block 10, as shown in FIG. 3, according to one embodiment, the manufacturing method 40 may include a first step 102 of removing material from the top deck 18 of the engine block 10 surrounding a first opening, such as at least one fluid passage 22, to create a first recessed area 46 including a bottom surface 48, a second step 103 of placing a first seal 90 around the first opening in the first recessed area 48 and on the first bottom surface 48, a third step 104 of positioning a first insert 50 within the first recessed area 46 and against the first seal 90, a fourth step 106 of removing material from the top deck 18 of the engine block 10 surrounding a second opening, such as a cylinder bore 16, to create a second recessed area 70 including a second bottom surface 74 that at least partially overlaps the first recessed area 46, a fifth step 107 of placing a second seal 95 around the second opening in the second recessed area 70 and on the second bottom surface 74, and a sixth step 108 of positioning a second insert 78 within the second recessed area 70 and against the second seal 95. The manufacturing method 40 may include an additional step of removing material from the first insert 50 and/or the second insert 78 to create a planar surface with the top deck 18. It should be appreciated that in other embodiments, the first recessed area may be formed around the cylinder bore 16 or another opening and the second recessed area may be formed around the fluid passage 22 or another opening. Thus, the insert surrounding the cylinder bore, for example, may have the greater thickness and may be installed prior to forming the second recessed area that surrounds the fluid passage 22.

It will be understood that the engine block 10 may include multiple top decks (such as with a Vee-style engine), multiple cylinder bores 16, and multiple fluid passages 22. Thus, the manufacturing method 40 may include creating multiple first recessed areas 46 and second recessed areas 70 and using multiple first inserts 50, first seals 90, second inserts 78, and second seals 95 in corresponding recessed areas. A plurality of first and second inserts 50, 78, and first and second seals 90, 95 may be packaged together as a repair kit for a predetermined engine.

First seals 90 and second seals 95 should not overlap into the fluid passage 22 or cylinder 16. To assure that the inner opening 92 of the first seal 90 is centered about the fluid passage 22, prior to placing the first seal 90 a flexible sheet (not shown) may be rolled and inserted into the fluid passage 22. The first seal 90 may then be slid over the rolled flexible sheet. The natural tendency of the rolled sheet to unroll pushes the sheet against the opening of the fluid passage and assists in the aligning of the inner opening 92 of the first seal 90 to the fluid passage. The first insert 50 may similarly be slid over the rolled sheet and positioned in the first recessed area 46. Once the first seal 90 and first insert 50 are fixed in place, the rolled sheet can be removed. A similar process may be used for aligning the second seal 95 with the opening of the cylinder 16.

It should be appreciated that cracks, such as cracks formed within or radiating from the first and second recessed areas 46, 70, may occur after repair. The presently disclosed method 40, as described herein, may be repeated to repair such cracks. Specifically, the first and second inserts 50, 78 and first and second seals 90, 95 may be removed, such as by creating one or more threaded bores within the inserts 50, 78 to attach a removal tool, and the additional cracks and/or wear occurring near the cylinder bore 16 and fluid passages 22 may be machined out. However, the recessed areas 46, 70 may be enlarged only an amount sufficient to remove most of the cracks and/or wear, without interfering with other structures or components of the engine block 10. As such, the engine block 10 may be limited to a finite number of repairs. After the additional engine block material has been removed, an appropriately dimensioned inserts 50, 78, and seals 90, 95 may be placed and press fit within the corresponding recessed areas 46, 70.

The presently disclosed method may provide an effective means for repairing cracks and/or wear occurring within an engine block, particularly at or near a cylinder bore and surrounding water passages. Alternatively, the present disclosure may be implemented during manufacture of an engine block to reduce the occurrence of such cracks and/or wear.

It should be appreciated that the disclosed method may be used on other openings in the engine block.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. A method for manufacturing an engine block, comprising:
    removing material from a top deck of the engine block surrounding a first opening to create a first recessed area including a first bottom surface;
    placing a first seal around the first opening on the first bottom surface, the first seal including an inner diameter that matches the first opening; and
    positioning a first insert within the first recessed area and against the first seal.

2. The method of claim 1, further comprising:
    removing material from the top deck of the engine block surrounding a second opening to create a second recessed area including a second bottom surface, the second recessed area at least partially overlapping the first recessed area;
    placing a second seal around the second opening on the second bottom surface, the second seal including an inner diameter that matches the second opening; and
    positioning a second insert within the second recessed area and against the second seal.

3. The method of claim 2, wherein the first recessed area has a first depth and the second recessed area has a second depth that is less than the first depth such that the first seal is not disturbed in the creation of the second recessed area.

4. The method of claim 2, wherein creating the second recessed area includes removing material from the first insert above a portion of the first seal.

5. The method of claim 2, wherein the first opening is a fluid passage and the second opening is a cylinder bore.

6. The method of claim 2, wherein at least one of the first removing step and the second removing step includes machining out a crack within the engine block.

7. The method of claim 1, wherein positioning the first insert within the first recessed area includes press fitting the first insert within the first recessed area.

8. The method of claim 2, wherein positioning the second insert within the second recessed area includes press fitting the second insert within the second recessed area.

9. The method of claim 1, wherein a liquid sealant is applied to the first recess prior to the positioning of the first insert.

10. The method of claim 2, wherein a liquid sealant is applied to the second recess prior to the positioning of the second insert.

11. The method of claim 1, wherein the first seal is selected from the group consisting of an o-ring, a rubber coated metal gasket, and an edge bonded integral seal.

12. The method of claim 2, wherein the second seal is selected from the group consisting of an o-ring, a rubber coated metal gasket, and an edge bonded integral seal.

13. An engine block, comprising:
a top deck;
a first opening formed within the engine block and opening through the top deck;
a first recessed area surrounding the first opening and including a first bottom surface;
a first seal on the first bottom surface, the first seal including an inner diameter that matches the first opening; and
a first insert positioned within the first recessed area.

14. The engine block of claim 13 further comprising;
a second opening formed within the engine block and opening through the top deck;
a second recessed area surrounding the seconds opening and including a second bottom surface;
a second seal on the second bottom surface, the second seal including an inner diameter that matches the second opening;
a second insert positioned within the second recessed area;
wherein the second recessed area, second seal, and the second insert overlap the first recessed area and the first insert.

15. The engine block of claim 14, wherein the first opening is a fluid passage and the second opening is a cylinder bore.

16. The engine block of claim 15, further including a plurality of fluid passages circumferentially spaced around the cylinder bore.

17. The engine block of claim 14, wherein the first recessed area has a first depth and the second recessed area has a second depth that is less than the first depth.

18. The engine block of claim 14, wherein the first insert and the second insert are retained within the first recessed area and the second recessed areas, respectively, by an interference fit.

19. The engine block of claim 17, wherein the first depth is about 50% or more greater than the second depth.

20. A remanufacturing kit for an engine block including a top deck defining a cylinder bore and a plurality of fluid passages surrounding the cylinder bore, comprising:
a plurality of cylindrical first inserts, each of the plurality of first inserts including a first depth, a first outer diameter, and a passage extending through the first insert, and being configured to be positioned within a recessed area surrounding one of the plurality of fluid passages;
a plurality of first seals including an inner diameter matching a diameter of one of the plurality of fluid passages, each of the first seals configured to be positioned between one of the first inserts and the engine block in the recessed area surrounding one of the plurality of fluid passages;
a ring-shaped second insert including an inner diameter matching a diameter of the cylinder bore, a second depth, and a second outer diameter and being configured to be positioned within a recessed area surrounding the cylinder bore;
a second seal including an inner diameter matching a diameter of the cylinder bore, the second seal configured to be positioned between the second insert and the engine block in the recessed area surrounding the cylinder bore;
wherein the first depth is greater than the second depth, and wherein when each of the plurality of first inserts are positioned within corresponding recessed area surrounding each of the plurality of fluid passages and the second insert is positioned with the recessed area surrounding the cylinder bore, the second outer diameter is configured to overlap a portion of the first outer diameter.

\* \* \* \* \*

UNITED STATES PATENT AND TRADEMARK OFFICE
CERTIFICATE OF CORRECTION

| | | |
|---|---|---|
| PATENT NO. | : 8,833,330 B2 | Page 1 of 1 |
| APPLICATION NO. | : 13/713266 | |
| DATED | : September 16, 2014 | |
| INVENTOR(S) | : Graham et al. | |

It is certified that error appears in the above-identified patent and that said Letters Patent is hereby corrected as shown below:

In the Claims,

Column 10, line 45, in Claim 1, delete "a top" and insert -- the top --.

Signed and Sealed this
Fifteenth Day of September, 2015

Michelle K. Lee
*Director of the United States Patent and Trademark Office*